(12) United States Patent
Smith (10) Patent No.: US 11,255,269 B2
(45) Date of Patent: Feb. 22, 2022

(54) VALVE ARRANGEMENT FOR A FUEL SYSTEM

(71) Applicant: ROLLS-ROYCE plc, London (GB)

(72) Inventor: Michael R. Smith, Birmingham (GB)

(73) Assignee: Rolls-Royce plc

( * ) Notice: Subject to any disclaimer, the term of this patent is extended or adjusted under 35 U.S.C. 154(b) by 48 days.

(21) Appl. No.: 16/740,708

(22) Filed: Jan. 13, 2020

(65) Prior Publication Data
US 2020/0277898 A1    Sep. 3, 2020

(30) Foreign Application Priority Data
Feb. 5, 2019    (GB) .................................. 1901548

(51) Int. Cl.
| | |
|---|---|
| *F02C 7/232* | (2006.01) |
| *F16K 35/02* | (2006.01) |
| *F16K 3/26* | (2006.01) |
| *F01D 21/14* | (2006.01) |
| *F02C 9/46* | (2006.01) |

(Continued)

(52) U.S. Cl.
CPC .............. *F02C 7/232* (2013.01); *F01D 21/14* (2013.01); *F02C 9/263* (2013.01); *F02C 9/266* (2013.01); *F02C 9/46* (2013.01); *F16K 3/26* (2013.01); *F16K 21/16* (2013.01); *F16K 35/022* (2013.01)

(58) Field of Classification Search
CPC .. F02C 7/232; F02C 5/12; F02C 9/266; F02C 9/263; F16K 15/025; F16K 3/26; F16K 35/022
See application file for complete search history.

(56) References Cited

U.S. PATENT DOCUMENTS 3,106,934 A *  10/1963  Rogers ..................... G05D 7/03
                                                    137/115.08
4,876,857 A    10/1989  Feltz et al.
(Continued)

FOREIGN PATENT DOCUMENTS

| GB | 644212 | 10/1950 |
|---|---|---|
| GB | 870806 | 6/1961 |

(Continued)

OTHER PUBLICATIONS

European search report dated Jun. 9, 2020, issued in EP Patent Application No. 20152101.0.

(Continued)

*Primary Examiner* — Alain Chau
(74) *Attorney, Agent, or Firm* — Barnes & Thornburg LLP (57) ABSTRACT

The disclosure relates to a valve for a fuel system having a body with at least one inlet and one outlet, the inlet fluidly connected to a pressurised fuel source in use. A shuttle is mounted within the body, the shuttle having a cavity of fixed volume and movable between a first position where fluid is permitted to flow through the inlet and is prevented from flowing through the outlet and a second position where fluid is prevented from flowing through the inlet and is permitted to flow through the outlet. A piston is configured to engage the fluid within the shuttle cavity to move the shuttle between the first and second position. A biasing mechanism biases the shuttle towards the first position and where the shuttle moves towards the second position when the fluid within the shuttle reaches a critical pressure.

19 Claims, 5 Drawing Sheets

(51) Int. Cl.
*F16K 21/16* (2006.01)
*F02C 9/26* (2006.01)

(56) References Cited

U.S. PATENT DOCUMENTS

| | | | |
|---|---|---|---|
| 5,327,720 A * | 7/1994 | Tran | F02C 7/232 137/489.5 |
| 5,619,232 A | 8/1997 | Maeno | |
| 8,429,892 B2 * | 4/2013 | Tentorio | F02C 7/232 60/39.094 |
| 8,596,417 B2 * | 12/2013 | Barrett | F16N 29/04 184/6.11 |
| 8,950,425 B1 * | 2/2015 | Jansen | F02C 7/232 137/340 |
| 9,732,748 B2 * | 8/2017 | Stein | F04B 19/22 |
| 2006/0278198 A1 | 12/2006 | Savage et al. | |
| 2008/0087339 A1 * | 4/2008 | Blaser | F01D 21/18 137/613 |
| 2009/0057588 A1 * | 3/2009 | Reilly | F16K 27/048 251/129.15 |
| 2012/0261000 A1 * | 10/2012 | Futa | F02C 7/228 137/101 |
| 2013/0008745 A1 * | 1/2013 | Barrett | F16N 29/04 184/6.11 |
| 2015/0330311 A1 | 11/2015 | Marocchini et al. | |
| 2017/0363008 A1 | 12/2017 | Marocchini et al. | |
| 2018/0163635 A1 | 6/2018 | Marocchini et al. | |

FOREIGN PATENT DOCUMENTS

| | | | | |
|---|---|---|---|---|
| JP | 2015025551 A * | 2/2015 | | F16K 11/07 |
| WO | 2014132089 | 9/2014 | | |

OTHER PUBLICATIONS

Great Britain search report dated Jul. 26, 2019, issued in GB Patent Application No. GB1901548.6.

* cited by examiner

VALVE ARRANGEMENT FOR A FUEL SYSTEM

CROSS-REFERENCE TO RELATED APPLICATIONS

This specification is based upon and claims the benefit of priority from United Kingdom patent application number GB 1901548.6 filed on Feb. 5, 2019, the entire contents of which are incorporated herein by reference.

BACKGROUND

Technical Field

The present disclosure relates to a valve arrangement for a fuel system, particularly, although not exclusively, a fuel system for a gas turbine engine.

Description to the Related Art

For lean burn combustion programmes in a gas turbine engine, it is desirable that the fuel supply to the fuel spray nozzles within the combustion chamber of the engine is switched on or off at a location very close to the burner head.

One method is to use actuators to open and close ports in a valve to permit or prevent fuel flow through the valve.

In the case the actuator (and any associated valve components) becomes jammed, for example, in an open state, the continuing supply of fuel will pose a fire hazard and/or damage the engine.

It is an aim of the present disclosure to find an improved valve design configuration.

SUMMARY

The present disclosure provides a valve, a fuel system, and a gas turbine engine, as set out in the appended claims.

According to a first aspect, there is provided a valve for a fuel delivery system, comprising: a valve body comprising an internal cavity, at least one inlet and one outlet, the inlet fluidly connected to a fuel source in use; a shuttle mounted within the body, the shuttle comprising a partition spanning the internal cavity and moveable relative to the inlet and outlet between a first position where the shuttle blocks the outlet whilst fluid is permitted to flow through the inlet and a second position whereby the outlet is opened whilst fluid is prevented from flowing through the inlet; a piston configured to engage the fluid within the internal cavity in order to move the shuttle between the first and second position; and a biasing mechanism arranged to bias the shuttle towards the first position; wherein the shuttle is moved towards the second position when the fluid within the cavity reaches a threshold pressure.

The shuttle may comprise or consist of a valve member that is moveable/translatable within the valve body.

The threshold pressure may comprise a pressure sufficient to overcome a biasing force provided by the biasing mechanism.

According to a second aspect, there is provided a fuel system for a gas turbine engine comprising the valve of the first aspect.

According to a third aspect, there is provided a gas turbine engine comprising the fuel system of the second aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18,5, 19, 19.5 or 20. The bypass ratio may be in an inclusive range bounded by any two of the values in the previous sentence (i.e. the values may form upper or lower bounds), for example in the range of from 13 to 16, or 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $NKG^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 degrees C. Purely by way of further example, the cruise conditions may correspond to: a forward Mach number of 0.85; a pressure of 24000 Pa; and a temperature of −54 degrees C. (which may be standard atmospheric conditions at 35000 ft).

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
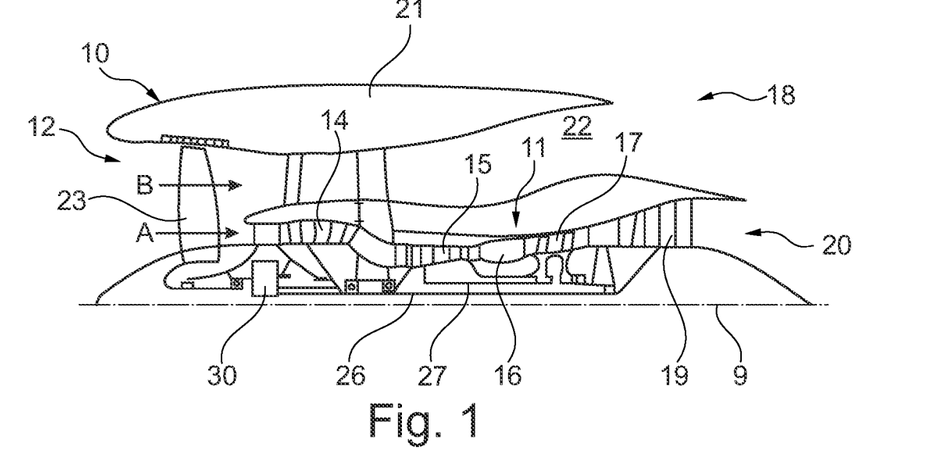
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
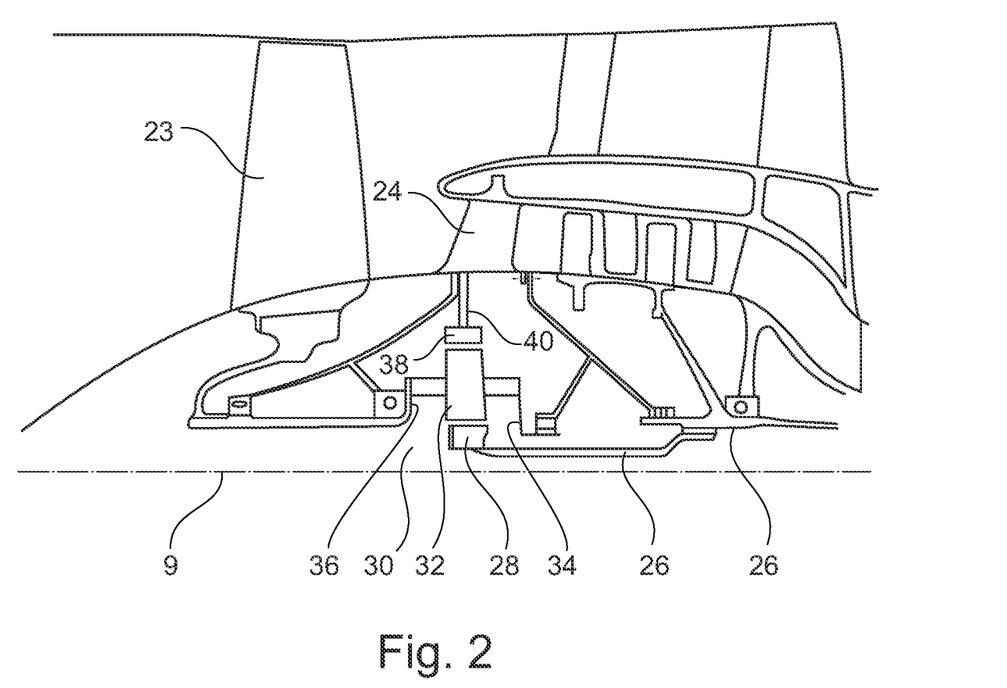
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
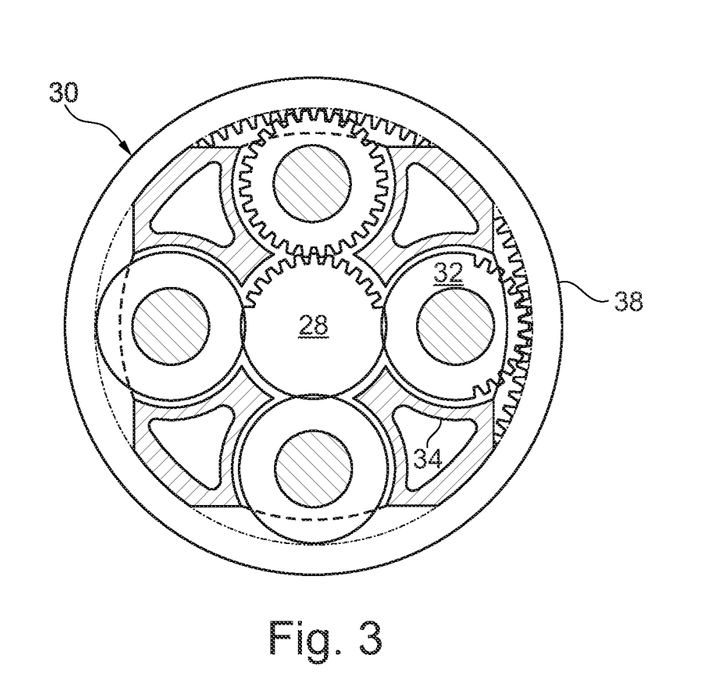
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
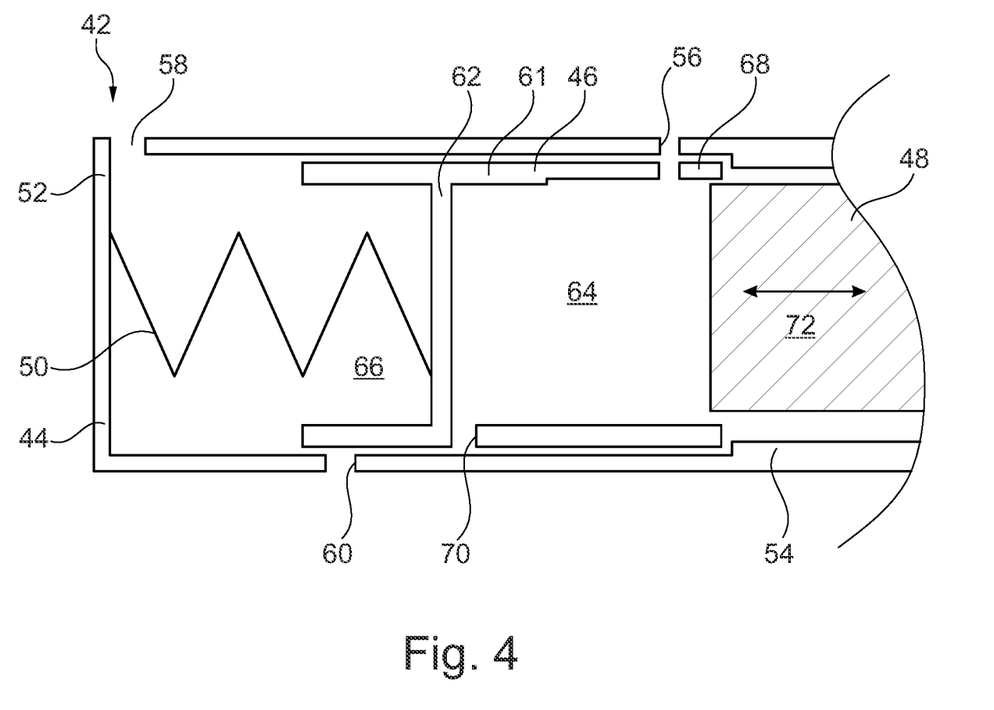
FIG. 4 is a close up of a valve arrangement in a first position
Figure 5:
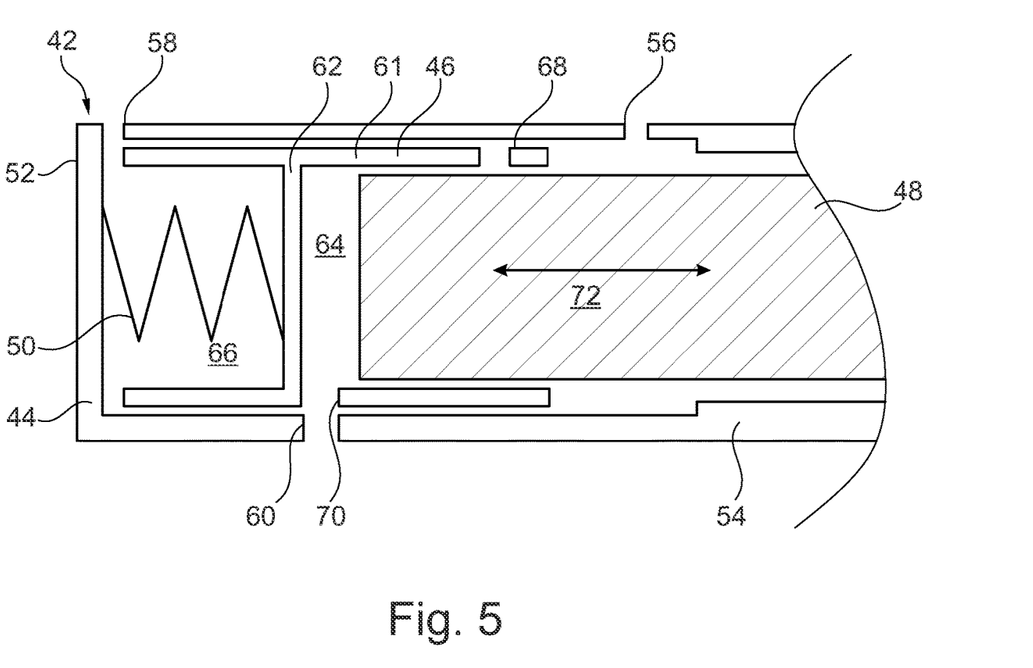
FIG. 5 is a close up of a valve arrangement in a second position

FIGS. 4 and 5 illustrate a valve arrangement 42. In an example, the valve arrangement 42 is for a fuel system in the combustion equipment 16 of a gas turbine engine 10. However, the valve arrangement could potentially be used in other fuel delivery systems, e.g. for other types of engine.

The valve arrangement 42 is provided between a fuel supply and one or more fuel spray nozzles within the combustion chamber of the engine. The valve arrangement 42 provides selective actuation of the fuel supply to the one or more fuel spray nozzles (i.e. provides a state where fuel flows to the fuel spray nozzles and provides a state where fuel does not flow to the fuel spray nozzles). The valve arrangement 42 may further provide a metered dose of fuel to the one or more fuel spray nozzles.

The valve arrangement 42 may be located in close proximity to the fuel spray nozzles. The valve arrangement 42 may be an integral part of the fuel spray nozzle assembly. Alternatively, the valve arrangement 42 may be part of the fuel control system of the gas turbine engine, e.g. further upstream of a fuel spray nozzle.

The valve arrangement 42 comprises a valve body 44. The valve body 44 comprises a hollow profile, such that a valve member 46, an actuator 48 and a biasing mechanism 50 may be located therein. The valve body 44 may comprise a substantially circular cross-sectional profile to form a substantially cylindrical/tubular body. Alternatively, the valve body 44 may comprise, inter alia, a rectangular, triangular, elliptical, or polygonal cross-sectional profile. The valve body 44 comprises a closed end 52, and an open end (not shown) in which the actuator 48 may be located.

The valve body 44 may comprise a corrosion resistant and/or heat resistant material. The valve may comprise a metallic material. The metallic material may be nickel and/or steel. The skilled person may be able to determine other suitable conventional materials.

The valve body 44 comprises a valve seat 54. The valve seat 54 is provided on the inner surface of the valve body 44. The valve seat 54 may extend fully or partially around the circumference of the valve body 44. The valve seat 54 may be annular in form.

The valve seat may comprise an abutment, against which a valve member 46, to be described below can abut when biased into a first operative condition, e.g. to fill the valve body.

The valve body 44 comprises a first inlet 56 fluidly connected to a fuel supply. The first inlet 56 may comprise an aperture. The first inlet 56 may comprise a valve and/or nozzle.

The first inlet 56 is disposed toward the open end of the valve body 44, i.e. spaced from the closed end 52. The first inlet 56 is disposed in a portion of the valve body 44 comprising the valve member 46. The valve body 44 may comprise one, or more further, first inlets. The one, or more further, first inlets may be spaced circumferentially around the valve body 44 and/or may be spaced axially along the valve body 44.

The valve body 44 comprises a second inlet 58 fluidly connected to a fuel supply. The second inlet 58 may comprise an aperture. The second inlet 58 may comprise a valve and/or nozzle. The second inlet 58 is disposed toward the closed end of the valve body 44.

The second inlet 58 is disposed in a portion of the valve body 44 comprising the biasing mechanism 50. That is to say the second inlet may open into a portion of the valve body 44 in which the biasing spring is mounted.

The first 56 and second 58 inlets are spaced by the valve member 46. The valve member 46 may block flow communication from the first inlet 56 to the second inlet 58 through the valve body interior.

The valve body 44 may comprise one, or more, further second inlets. The one, or more further, second inlets may be spaced circumferentially around the valve body 44 and/or may be spaced axially along the valve body 44.

The valve body 44 comprises an outlet 60, which in this example may be fluidly connected to a fuel spray nozzle.

The outlet 60 may comprise an aperture. The outlet 60 may comprise a valve and/or nozzle.

The outlet is located closer to the closed end 52 of the valve body 44 than the first inlet 56. The outlet may be located at a location along the valve body 44 that is between the first 56 and second 58 inlets.

The outlet 60 is disposed in a portion of the valve body 44 comprising the valve member 46 and/or biasing member 50.

The valve body 44 may comprise one, or more further, outlets. The one or more further outlets may be spaced circumferentially around the valve body 44 and/or may be spaced axially along the valve body 44.

The outlet 60 is axially displaced with respect to the first inlet 56. Whilst in this example, the outlet 60 is axially displaced toward the closed end 52 of the valve body 44, the outlet 60 could otherwise be axially displaced toward the open end of the valve body 44.

The outlet 60 may be circumferentially displaced with respect to the first inlet 56. The outlet 60 may be circumferentially displaced by 180 degrees. The outlet 60 may be circumferentially displaced by 90 degrees. The outlet 60 may be circumferentially displaced by between 0 degrees and 180 degrees.

In this example, the valve outlet is on the opposing side of the valve body from the inlet 56.

The valve arrangement 42 comprises a valve member 46. The valve member 46 is movably mounted within the valve body 44. The valve member 46 comprises side walls 60 to provide a substantially hollow profile. The valve member 46 may comprise a substantially circular cross-sectional profile to form a substantially cylindrical body. Alternatively, the valve member 46 may comprise, inter alia, a rectangular, triangular, elliptical, or polygonal cross-sectional profile. The cross-sectional profile of the valve member may substantially match that of the interior of the valve body 44.

The side walls 60 of the valve member form a close fit and/or liquid-tight seal between the valve member 46 and the interior of the valve body 44.

The valve member 46 comprises a panel or partition wall 62 extending between the side wall 61. The partition spans the internal/cavity area of the valve body 44 so as to fluidly isolate the interior of the valve body into two cavities, one on each side of the partition 62.

The partition 62 engages the side wall 61 to define a first cavity 64 extending toward the open end of the valve body 44. A second cavity 66 is defined as extending from the other side of the partition 62 towards the closed end 52 of the valve body 44. The partition may be disposed at the end of the valve member adjacent the biasing mechanism. Alternatively, the partition 62 may be disposed part way along the valve member 46 to define a minimum volume of the second cavity 66

The valve member 46 comprises an inlet 68. The inlet 68 may comprise an aperture. The aperture is configured for selective alignment with the first inlet 56 in an open condition. The aperture may be configured to correspond to the shape and/or size of the first inlet 56 provided on the valve body 44.

The inlet 68 may comprise a valve and/or nozzle. The valve and/or nozzle may be configured to engage a valve and/or nozzle provided by the first inlet 56 provided on the valve body 44

The valve member 46 may comprise one, or more further, inlets. The one or more further inlets may be disposed circumferentially around the valve member 46 and/or may be disposed axially along the valve member 46, e.g. to correspond with a plurality of first inlets 56 of the valve body.

The valve member 46 comprises an outlet 70. The outlet 70 may comprise an aperture. The aperture is configured for selective alignment with the outlet 60 when in an open condition. The aperture may be configured to correspond to the shape and/or size of the outlet 60 provided on the valve body 44

The outlet 70 may comprise a valve and/or nozzle. The valve and/or nozzle may be configured to engage a valve and/or nozzle provided by the outlet 60 provided on the valve body 44

The valve member 46 may comprise one, or more further, outlets. The one or more further outlets may be disposed circumferentially around the valve member 46 and/or may be disposed axially along the valve member 46, e.g. to correspond with a plurality of outlets 60 of the valve body.

The outlet 70 is axially spaced/displaced with respect to the inlet 68. The outlet 70 may be axially displaced toward the closed end 52 of the valve body 44. In an alternative configuration, the outlet 70 may be axially located closer to the open end of the valve body 44.

The inlet 68 and outlet 70 of the valve member are both located to the same side of the partition 62, i.e. within the same cavity within the valve body.

The axial spacing between the inlet 68 and outlet 70 of the valve member 46 is different from the spacing between the inlet 56 and outlet 60 of the valve body. This ensures that the inlet and outlet cannot both be open at the same time. In this example, the axial spacing between the inlet 68 and outlet 70 of the valve member is less the axial spacing between the inlet 56 and outlet 60 of the valve body.

The outlet 70 may be circumferentially displaced with respect to the inlet 68. The outlet 70 may be circumferentially displaced by 180 degrees. The outlet 60 may be circumferentially displaced by 90 degrees. The outlet 60 may be circumferentially displaced by between 0 degrees and 180 degrees. The circumferential spacing may match the spacing between the inlet 56 and outlet 60 of the valve body.

In this example, the outlet 70 is on the opposing side of the valve member from the inlet 68.

The valve arrangement 42 comprises an actuator 48. The actuator comprises an arm or piston 72. The piston 72 is provided at the open end of the valve body 44 and extends into the open end of the valve body 44. In the condition shown, the piston terminates, e.g. at an end face, adjacent inlet 56 of the valve body.

The piston 72 is shaped to correspond to the profile of the valve body 44 interior. The outer surface of the piston 72 forms a close fit and/or liquid-tight seal with the interior of the valve member 46/valve seat 54.

The piston 72 is shaped so as to extend into/through the valve seat 54. The piston 72 is further shaped so as to extend into the first cavity 64 and along the side wall 61 of the valve member 46. The end profile of the piston 48 may match that of the partition 62.

The piston 72 is actuatable within the valve arrangement in a linear/axial direction. The piston 72 is configured to move towards and away from the closed end 52 of the valve body 44.

The actuator 48 may comprise a linear actuator, such as an electrical solenoid configured to move the piston 72. Alternatively, the actuator 48 may comprise, inter alia, a hydraulic actuator, a pneumatic actuator or a mechanical actuator.

The valve arrangement 42 comprises a biasing mechanism 50. The biasing mechanism 50 is configured to bias the valve member 46 away from the closed end.

The biasing mechanism 50 is disposed between the closed end 52 of the valve body 44 and the valve member 46. The biasing mechanism 50 engages the valve member 46, e.g. on the opposing side of the partition wall 62 from the piston 72.

The biasing mechanism 50 may be affixed to the valve member 46 or may engage the valve member 46 without fixation. In one example, the biasing mechanism 50 engages the partition 62 provided on the valve member 46. The biasing mechanism 50 may extend into cavity 66, if present. In an alternative example, the biasing mechanism 50 engages the side walls 61 of the valve member 46.

The biasing mechanism 50 may comprise a resilient biasing means. The resilient biasing means may comprise a spring. The spring may comprise, inter alia, a compression spring, an extension spring, a torsion spring, a constant force spring, or a Belleville spring. Alternatively, the resilient biasing means may comprise a pneumatic device.

In a further example, a plurality of valve arrangements are operated using a common actuator 48 and/or piston 72.

Figure 6:
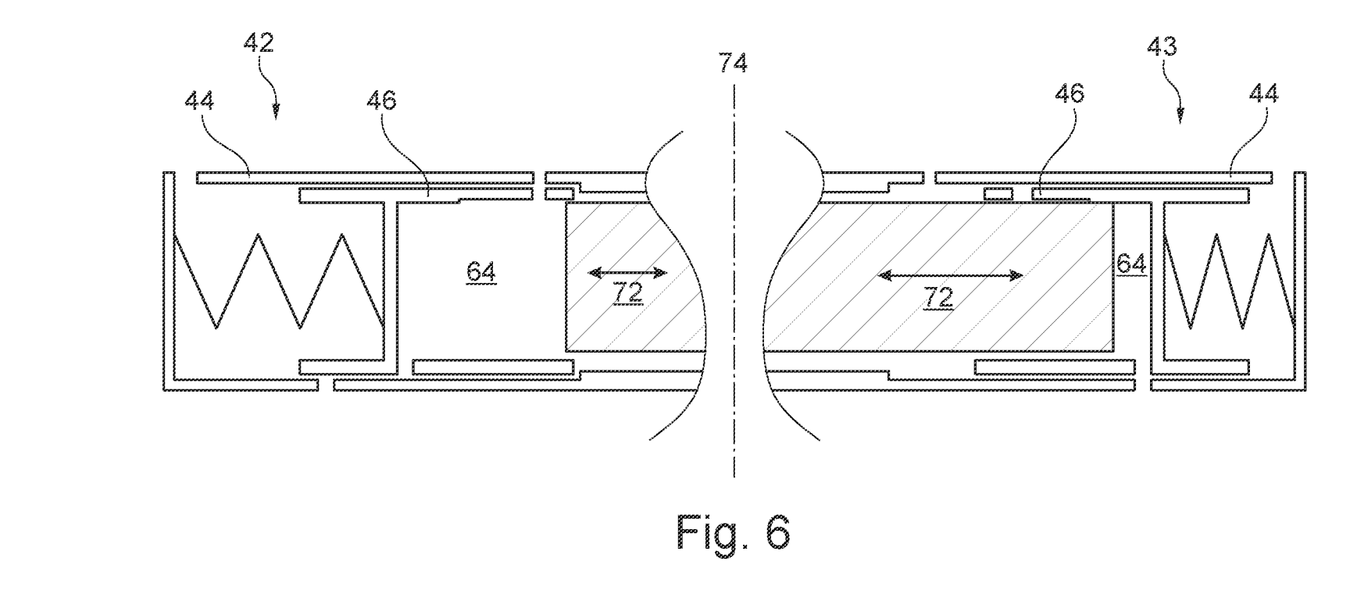
FIG. 6 is a close up of an arrangement comprising a first and second valve arrangement.

As shown in FIG. 6, a first valve arrangement 42 and a second valve arrangement 43 are operated using a common actuator 48. The valve arrangements 42,43 are substantially identical and are provided about a mirror axis 74.

Two valve members 46 are provided at opposing ends of the piston 72. The two valve members 46 are provided in a mirror arrangement about the piston 72.

A single valve body 44 may be provided, or alternatively, separate valve bodies for each end of the piston may be provided.

Operation of the Valve Arrangement

FIG. 4 shows the valve arrangement in a first position to provide a filling cycle. In the first position the piston 72 of the actuator 48 is in a retracted position relative to the end wall 52 and/or cavity 64. The piston end is retracted behind the opening 56 and opening 68.

The valve member 46 is biased by the biasing mechanism 50 towards the open end of the valve body 44 and rests against the valve seat 54.

The first inlet 56 provided on the valve body 44 and the inlet 68 provided on the valve member are aligned. This permits fuel from the fuel supply to flow into the cavity 64. The cavity 64 provides a fixed volume and therefore holds a fixed, or metered, volume of fuel in this condition.

The outlet 60 provided on the valve body 44 and the outlet 70 provided on the valve member 46 are misaligned. The outlet 70 provided on the valve member 46 overlies a wall portion of the valve body 44, preventing egress of fuel from the cavity 64.

Fuel may freely enter/leave the second inlet 58 provided on the valve body 44 and the volume to the left-hand side of partition 62 (i.e. surrounding the biasing mechanism 50 and cavity 66) may be flooded.

The biasing force provided by the biasing mechanism 50 may be sufficient to prevent movement of the valve member 46 from this condition under the operational fluid pressure alone.

Once an appropriate amount of fuel enters the valve member, an emptying cycle is performed by actuation of the piston.

FIG. 5 shows the valve arrangement in a second position to provide the emptying cycle.

At the beginning of the emptying cycle, the actuator is activated and the piston 72 begins to extend into the cavity 64 towards the partition 62. The piston 72 moves to a position that overlies the inlet 68 provided on the valve member 46 and prevents further fuel from entering.

Further extension of piston increases the pressure of the fuel within the cavity 64. The biasing force of the mechanism 50 opposes the fluid pressure in the cavity 64. Once the pressure reaches/exceeds a threshold level, the force provided by pressure onto the valve member will be greater than the biasing force provided by the biasing mechanism 50. This will result in the valve member 46 moving against the biasing mechanism 50 towards the closed end 52 of the valve body 44. As a result of the movement of the valve member, the first inlet 56 provided on the valve body 44 and the inlet 68 provided on the valve member become misaligned, further preventing flow of fuel into the cavity 64.

At the same time, fuel is also ejected from the area surrounding the biasing mechanism 50 and cavity 66 through the second inlet 58. This can prevent excessive pressure build up on the opposing side of the partition 62 from the piston 72.

The valve member 46 is further moved by the actuator 48 to a second position where the outlet 60 provided on the valve body 44 is aligned with the outlet 70 provided on the valve member 46. This permits fuel to egress from the cavity 64, e.g. to flow towards the combustion equipment 16, e.g. the burner head or nozzle, in this example.

The piston 72 is further driven by the actuator 48 into the cavity 64 to eject fuel from the cavity 64. The piston 72 fully occupies the cavity 64 and ejects all of the fuel contained within the cavity. The piston 72 may then be retracted.

Upon retraction of the piston 72, the biasing mechanism 50 acts to bias the valve member 46 away from the closed end 52 of the valve body. The valve member moves towards the open end of the valve body and the outlet 60 provided on the valve body 44 becomes misaligned with the outlet 70 provided on the valve member 46, and any further egress of fuel is prevented. This closure of the outlet is achieved before the inlet is opened on the return stroke.

The piston 72 is retracted fully to allow the valve member 46 to return to the first position. Once again, the first inlet 56 provided on the valve body 44 and the inlet 68 provided on the valve member are aligned. The outlet 60 provided on the valve body 44 and the outlet 70 provided on the valve member 46 are again misaligned.

The filling and emptying cycle is then repeated. Then number of cycles may be monitored to determine the fuel consumption based on the metered volume of fuel provided at each cycle. Metered fuel delivery can thus be controlled using the valve arrangement, e.g. by controlling the frequency/speed of the filling and emptying cycle. A conventional engine or fuel delivery controller may be used for this purpose, in communication with the actuator 48 so as to send control instructions thereto.

The first inlet 56 and the outlet 60 of the valve body 44 and the inlet 68 and the outlet 70 of the valve member 46 are configured such that at most one fluid pathway in or out of the cavity 64 is provided at a given time. At no point in the cycle can fuel flow into the valve arrangement and out of the valve arrangement 42 simultaneously. Throughout the majority of the cycle fuel can neither flow into the valve arrangement 42 nor out of the fuel arrangement 42.

Where a plurality of valve arrangements are provided using a common actuator, operation of the valve arrangements remains substantially the same as described above, save that both advancing and retracting strokes of the piston can be used simultaneously to meter/control fluid flow through two valve arrangements simultaneously.

As shown the FIG. 6, the first valve arrangement 42 and the second valve arrangement 43 are configured so that when the first valve arrangement 42 is in the first position (i.e. the filling cycle), the second valve arrangement 43 is in the second position (i.e. the emptying cycle).

The piston 72 is then moved toward the first valve arrangement 42, so that the first valve arrangement 42 is in the second position (i.e. the emptying cycle) and the second valve arrangement 43 is in the first position (i.e. the filling cycle).

The piston 72 is then moved back toward the second valve arrangement 43 and the cycle is repeated. Thus equivalent operation of two valve arrangements is achieved but each valve being out of phase with respect to the operation of the other.

Advantages of the Valve AArrangement:

The valve arrangement prevents unrestricted flow of fuel through the valve in case of failure of the actuator.

The valve arrangement prevents excess fuel entering the engine and damaging the turbine.

The valve arrangement provides a fail-safe to prevent leakage of fuel.

The valve arrangement permits each cycle of the arrangement to provide a metered dose of fuel.

The valve arrangement permits efficient fuel consumption of the gas turbine engine.

The dual valve arrangement allows double the rate of fuel delivery for a single stroke of the actuator. This can reduce the number/weigh of actuators and/or allow greater variation in volumetric flow rate through the metering valve.

Whilst the present disclosure has been discussed in terms of a gas turbine engine, the valve arrangement 42 may be used in any field where the controlled transmission of a fuel/fluid is required. The valve arrangement 42 may be used with any suitable fluids, including liquids and/or gasses.

The valve arrangement 42 may comprise gas tight seals between the valve member 46 and the valve body 44. The valve arrangement 42 may comprise gas tight seals between the actuator 48 and the valve body 44/valve seat 54.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A valve for a fuel delivery system, comprising:
   a valve body comprising an internal cavity, at least one inlet and one outlet, the inlet fluidly connected to a fuel source in use;
   a shuttle mounted within the body, the shuttle comprising a partition spanning the internal cavity and moveable relative to the inlet and outlet between a first position where the shuttle blocks the outlet whilst fluid is permitted to flow through the inlet and a second position whereby the outlet is opened whilst fluid is prevented from flowing through the inlet;
   a piston configured to engage the fluid within the internal cavity in order to move the shuttle between the first and second position; and
   a biasing mechanism arranged to bias the shuttle towards the first position;
   wherein the shuttle is moved towards the second position when the fluid within the cavity reaches a threshold pressure, and
   wherein the shuttle comprises the partition and a side wall having an open end so as to define an internal volume within the shuttle, wherein the internal volume defines a predetermined metered volume of fuel and the piston extends into the internal volume of the shuttle to expel the fluid therein when the shuttle is in the second position.

2. The valve according to claim 1, where the valve body has a longitudinal axis and the shuttle is translatable along said axis.

3. The valve according to claim 2, wherein the inlet and outlet are axially spaced.

4. The valve according to claim 1, where the shuttle comprises a side wall shaped to occlude the outlet in the first condition.

5. The valve according to claim 4, wherein the side wall comprises a discontinuity arranged to pass over the outlet as the shuttle moves to the second condition and thereby open the outlet in the second condition.

6. The valve according to claim 4, wherein the shuttle comprises an outlet, the shuttle outlet aligning with the housing outlet when the shuttle is in the second position.

7. The valve housing according to claim 4, wherein the shuttle side wall comprises an inlet, the shuttle inlet aligning with the housing inlet when the shuttle is in the first position.

8. The valve according to claim 7, where the shuttle inlet and the shuttle outlet are axially offset by a distance that is less than a stroke length of the piston and/or an axial spacing between the housing inlet and outlet.

9. The valve according to claim 1, where the piston is configured to extend into the cavity to expel the fluid therefrom.

10. The valve according to claim 1, where the piston comprises a solenoid actuator.

11. The valve according to claim 1, where the housing comprises a second inlet located on an opposing side of the partition from the first inlet and/or separated from the first inlet by the partition.

12. The valve according to claim 1, wherein the internal cavity is divided into two separate cavity portions by the partition, the two cavity portions being of variable volume according to the location of the shuttle.

13. The valve according to claim 1, wherein the piston extends fully into the internal volume into abutment with the partition when the shuttle is in the second position.

14. A fuel system for a gas turbine engine, the fuel system comprising the valve of claim 1.

15. A gas turbine engine comprising the fuel system of claim 14.

16. The gas turbine engine according to claim 15, further comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft.

17. The gas turbine engine according to claim 16, wherein: the turbine is a first turbine, the compressor is a first compressor, and the core shaft is a first core shaft; the engine core further comprises a second turbine, a second compressor, and a second core shaft connecting the second turbine to the second compressor; and the second turbine, second compressor, and second core shaft are arranged to rotate at a higher rotational speed than the first core shaft.

18. A valve for a fuel delivery system, comprising:
   a valve body comprising an internal cavity, at least one inlet and one outlet, the inlet fluidly connected to a fuel source in use;
   a shuttle mounted within the body, the shuttle comprising a partition spanning the internal cavity and moveable relative to the inlet and outlet between a first position where the shuttle blocks the outlet whilst fluid is permitted to flow through the inlet and a second position whereby the outlet is opened whilst fluid is prevented from flowing through the inlet;
   a piston configured to engage the fluid within the internal cavity in order to move the shuttle between the first and second position; and
   a biasing mechanism arranged to bias the shuttle towards the first position;
   wherein the shuttle is moved towards the second position when the fluid within the cavity reaches a threshold pressure, and
   wherein the valve housing and shuttle comprise a first valve housing and a first shuttle, the valve comprising a further valve housing and a further shuttle sharing a common piston with the first valve housing and the first shuttle, and configured such that when the first shuttle is in the first position, the further shuttle is in the second position.

19. The valve according to claim 18, wherein opposing ends of the piston engage within the first and further valve housings respectively.

* * * * *